United States Patent
Chiu et al.

(10) Patent No.: US 9,459,811 B2
(45) Date of Patent: Oct. 4, 2016

(54) DISK ARRAY SYSTEM AND DATA PROCESSING METHOD

(71) Applicant: ASMedia Technology Inc., New Taipei (TW)

(72) Inventors: Ming-Hui Chiu, New Taipei (TW); Chia-Hsin Chen, New Taipei (TW); Yung-Chi Hwang, New Taipei (TW); Ching-Fa Hsiao, New Taipei (TW)

(73) Assignee: ASMEDIA TECHNOLOGY INC., New Taipei (TW)

( * ) Notice: Subject to any disclaimer, the term of this patent is extended or adjusted under 35 U.S.C. 154(b) by 99 days.

(21) Appl. No.: 14/273,539

(22) Filed: May 8, 2014

(65) Prior Publication Data

US 2014/0351510 A1 Nov. 27, 2014

(30) Foreign Application Priority Data

May 22, 2013 (TW) .............................. 102118072 A

(51) Int. Cl.
G06F 3/06 (2006.01)

(52) U.S. Cl.
CPC .............. *G06F 3/0659* (2013.01); *G06F 3/065* (2013.01); *G06F 3/0613* (2013.01); *G06F 3/0617* (2013.01); *G06F 3/0689* (2013.01); G06F 2003/0692 (2013.01)

(58) Field of Classification Search
CPC .. G06F 3/0659; G06F 3/0613; G06F 3/0617; G06F 3/065; G06F 3/0689; G06F 2003/0692
See application file for complete search history.

(56) References Cited

U.S. PATENT DOCUMENTS

| 6,985,997 B2 * | 1/2006 | Jiang ..................... G06F 3/0689 711/100 |
| 7,330,930 B1 * | 2/2008 | Nagshain ............... G06F 3/0611 711/112 |
| 2007/0115731 A1 | 5/2007 | Hung |
| 2008/0010505 A1 * | 1/2008 | Daikokuya ......... G06F 11/1092 714/6.2 |
| 2010/0228944 A1 * | 9/2010 | Bassett ............... G06F 12/1027 711/207 |
| 2012/0072680 A1 * | 3/2012 | Kimura ................. G06F 11/108 711/154 |

FOREIGN PATENT DOCUMENTS

| CN | 101661378 B | 9/2011 |
| TW | I350970 | 10/2011 |
| WO | WO 2014002160 A1 * | 1/2014 ........... G06F 3/0634 |

OTHER PUBLICATIONS

Dees, B., "Native Command queuing—advanced performance in desktop storage," in Potentials, IEEE, vol. 24, No. 4, pp. 4-7, Oct.-Nov. 2005 doi: 10.1109/MP.2005.1549750.*

* cited by examiner

*Primary Examiner* — Jared Rutz
*Assistant Examiner* — William E Baughman
(74) *Attorney, Agent, or Firm* — CKC & Partners Co., Ltd.

(57) ABSTRACT

A disk array system and a data processing method are provided. The data processing method is applied to the disk array system. The disk array system includes a first disk and a second disk. The data processing method includes: receiving a reading command, wherein the reading, command includes a data starting address; determining to assign the reading command to the first disk or the second disk according to the data starting address of the reading command and a stripe size; and reading corresponding data according to the reading command from the first disk or the second disk which receives the reading command.

10 Claims, 2 Drawing Sheets

DISK ARRAY SYSTEM AND DATA PROCESSING METHOD

CROSS-REFERENCE TO RELATED APPLICATION

This application claims the priority benefit of Taiwan application serial No. 1021118072, filed on May 22, 2013. The entirety of the above-mentioned patent application is hereby incorporated by reference herein and made a part of specification.

BACKGROUND OF THE INVENTION

1. Field of the Invention

The disclosure relates to a disk array system and a data processing method thereof.

2. Description of the Related Art

As the electronic technology develops, a disk array system stored data is widely used in electronic devices, such as a personal computer (PC) and a network server.

The disk array system may be a redundancy array of independent disks 1 (RAID 1) system. The RAID 1 system includes a plurality of disks. When operating the writing data process in RAID 1 system, the data is written to different disks at the same time (which means the RAID 1 system backups the data in a main disk via at least one image disk) to improve the data reliability. When operating the reading data process in RAID 1 system, the data is read from one single disk (such as the main disk) and then send the data back to the host. Thus, the reading speed of the RAID 1 system is limited by the reading speed of the disk, which causes the efficiency of read to be difficultly improved.

BRIEF SUMMARY OF THE INVENTION

A disk array system is provided. In an embodiment, the disk array system is electrically connected to a host and receives a reading command of the host. The reading command includes a data starting address. The disk array system includes a first disk, a second disk and a control device. The control device receives the reading command and assigns the reading command to the first disk or the second disk according to the data starting address and a stripe size of the reading command. The first disk or the second disk which receives the reading command reads corresponding data according to the reading command.

A data processing method is also provided. In an embodiment, the data processing method is applied to a disk array system. The disk array system is electrically connected to a host. The disk array system includes a first disk and a second disk. The data processing method includes: receiving a reading command, wherein the reading command includes a data starting address; determining to assign the reading command to the first disk or the second disk according to the data starting address and a stripe size of the reading command; and reading corresponding data according to the reading command via the first disk or the second disk which receives the reading command.

These and other features, aspects and advantages of the present disclosure will become better understood with regard to the following description, appended claims, and accompanying drawings.

DETAILED DESCRIPTION OF THE EMBODIMENTS

Figure 1:
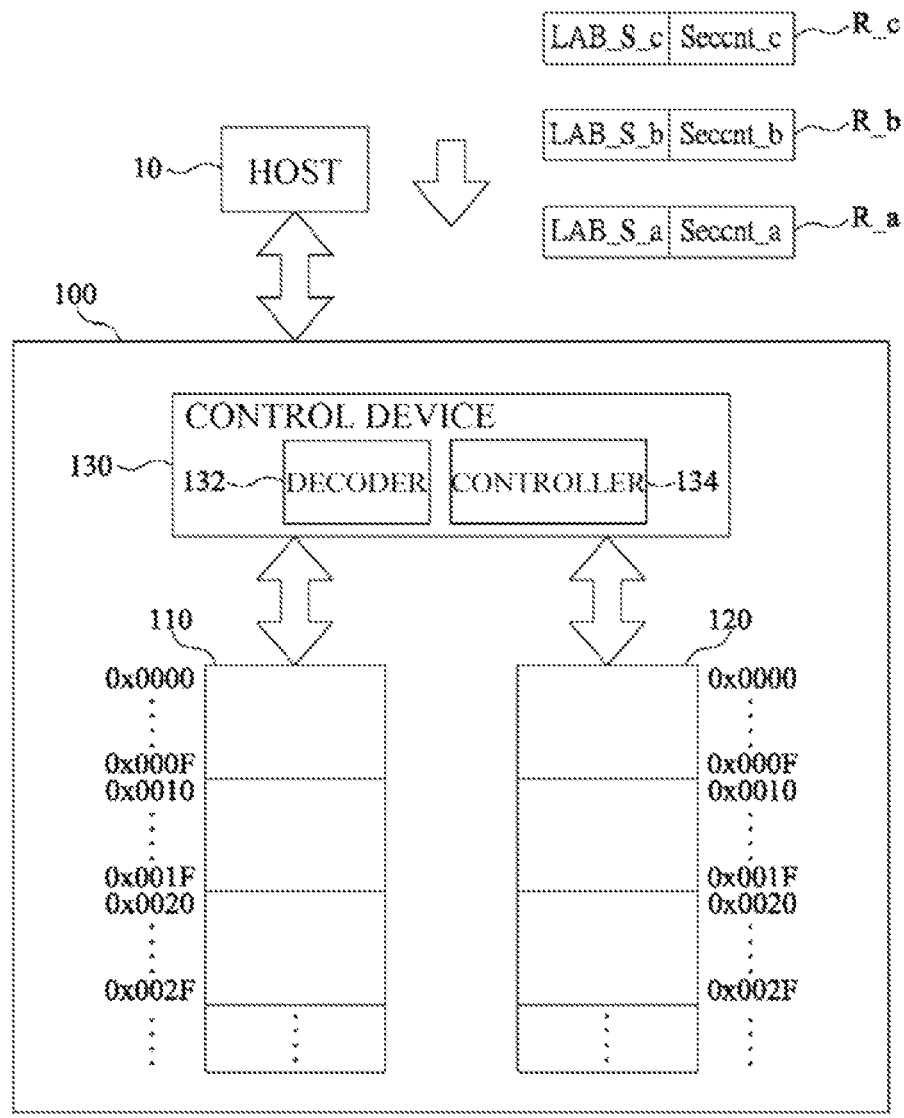
FIG. 1 is a schematic diagram showing a disk array system in an embodiment.

FIG. 1 is a schematic diagram showing a disk array system 100 in an embodiment. The disk array system 100 includes a control device 130 and a plurality of disks, such as a first disk 110 and a second disk 120. The control device 130 is electrically connected to the first disk 110, the second disk 120 and the host 10, respectively.

In an embodiment, the control device 130 may be achieved via a logic circuit, an integrated circuit, a programmable logic device (PLD) or a complex programmable logic device (CPLD). Furthermore, the control device 130 may include a decoder 132 and a controller 134, which is not limited herein.

In the embodiment, the first disk 110 and the second disk 120 includes a plurality of stripes, respectively. Each of the stripes includes a plurality of storage spaces (the number of the storage spaces of each of the stripes is called a stripe size, which can be set by the user). A plurality of logic block addresses (LAB) of the disk array system 100 correspond to the storage space of the first disk 110 or the storage space of the second disk 120, and data stored in the first disk 110 and the second disk 120 are the same, which forms a disk configuration of the RAID 1 system. In the embodiment, the number of the disks is two, which is not limited herein.

Figure 2:
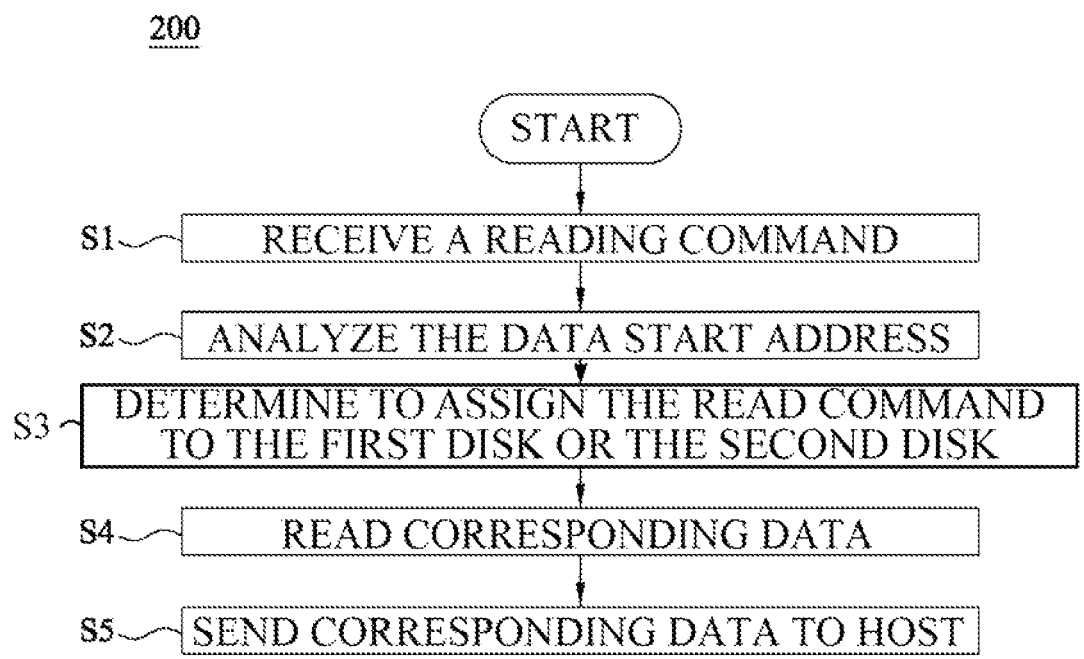
FIG. 2 is a flow chart showing a data processing method in an embodiment.

FIG. 2 is a flow chart showing a data processing method 200 in an embodiment. The data processing method 200 is applied to the disk array system 100 in FIG. 1, which is not limited herein.

The steps of the data processing method 200 illustrated hereinafter does not need to be executed in a specific sequence unless expressly stated. Moreover, the steps can be executed at the same time.

First, after the disk array system 100 starts operation, the control device 130 receives the reading command from the host 10 (step S1). The reading command includes a data starting address LAB_S and a data length Seccnt. The data starting address LAB_S means a start logic, block address of the corresponding data in the disk array system 100. The data length Seccnt means the corresponding data size.

Then, the control device 130 analyzes the data starting address LAB_S of the reading command via the decoder 132 (step S2). The control device 130 determines to assign the reading command to the first disk 110 or the second disk 120 via the controller 134 according to the data starting address and the stripe size of the reading command (step S3).

After the first disk 110 or the second disk 120 receives the reading command, the first disk 110 or the second disk 120 which receives the reading command reads the corresponding data stored in the first disk 110 or the second disk 120 according to the data starting address LAB_S and the data length Seccnt of the reading command (step S4). The first disk 110 or the second disk 120 which receives the reading command sends the corresponding data and a corresponding state to the host 10 via the control device 130 (step S5). The corresponding state may be a reading normal state or a reading error state.

When the disk array system 100 continuously receives multiple reading commands from the host 10, the control device 130 assigns the reading commands to the first disk 110 and the second disk 120, respectively, so as to make the first disk 110 and the second disk 120 read data according to the received reading command at the same time and increase the data reading speed.

In an embodiment, the disk array system 100 may also use a disk access technology, such as a native command queuing (NCQ) technology, to continuously read the data stored in the first disk 110 or the second disk 120, which can efficiently increase the data reading speed and extend the service life of the disk.

The data processing method 200 can be applied to various transmission interfaces, such as a serial advanced technology attachment (SATA) interface, a small computer system interface (SCSI) interface or a universal serial bus (USB) interface, which is not limited herein.

Operations of assigning the reading command is illustrated hereinafter, which is not limited, herein.

In an embodiment, the stripe size can be set as 16, which means each of the stripes includes storage spaces directed by 16 LBAs. The LBAs of the disk array system 100 are 0x0000 to 0x000F, 0x0010 to 0x001F, 0x0020 to 0002F and so on, which can direct the storage spaces of the first disk 110 or the second disk 120.

In the embodiment, the disk array system 100 continuously receives the reading commands R_a to R_c. The data starting address LAB_S_a of the reading command R_a is 0x0001. The data starting address LAB_S_b of the reading command R_b is 0x0010. The data starting address LAB_S_c of the reading command R_c is 0x0100.

The control device 130 can assign the reading command Ra to the first disk 110, assign the reading command R_b to the second disk 120, and assign the reading command R_c to the first disk 110, respectively, according to the stripe size and the data starting addresses LAB_S_a to LAB_S_c.

For example, the control device 130 can set a first operating parameter S_size_1 via the controller 134 according to the stripe size. The first operating parameter S_size_1 may be a binary expression of the stripe size. For example, it the stripe size is 16, the first operating parameter S_size_1 is 8'b0001_0000. Then, the control device 130 logically adds lowest bytes of the first operating parameter S_size_1 and the data starting addresses LAB_S_a to LAB_S_c via the controller 134 to get a first operating value, and the control device 130 determines to assign the reading commands R_a to R_c to the first disk 110 or the second disk 120 according to whether the first operating value has the number "1".

For example, the control device 130 executes AND logic operation between the lowest byte (8'b0001_0000) of the first operating parameter S_size_1 and the lowest byte (8'b0000_0001) of the data starting address LBA_S_a (0x0001) of the reading command R_a via the controller 134 to get the first operating value 8'b0000_0000. The first operating value does not have the number "1", and thus the reading command R_a is assigned to the first disk 110.

Additionally, the control device 130 may execute AND logic operation between the lowest byte (8'b0001_0000) of the first operating parameter S_size_1 and the lowest byte (8'b0001_0000) of the data starting address LBA_S_b (0x0010) of the reading command R_b via the controller 134 to get the first operating value 8'b0001_0000. The first operating value has the number 1, and thus the reading command R_b is assigned to the second disk 120.

The control device 130 executes AND logic operation between the lowest byte (8'b0001_0000) of the first operating parameter S_size_1 and the lowest byte (8'b0000_0000) of the data starting address LBA_S_c (0x0100) of the reading command R_c via the controller 134 to get the first operating value 8'b0000_0000. The first operating value does not have the number "1", and thus the reading command R_c is assigned to the first disk 110.

The first disk 110 and the second disk 120 can read the data stored therein at the same time according to the reading commands R_a to R_c to increase the data reading speed.

In an embodiment, the control device 130 can determine to assign the reading commands R_a to R_c by a different way.

For example, the control device 130 can also set a second operating parameter S_size_2 via the controller 134 according to the stripe size. The second operating parameter S_size_2 may be a base 2 log of the stripe size. For example, if the stripe size is 16, the second operating parameter S_size_2 is 0x04. Then, the control device 130 shifts the data starting address LAB_S to the right via the controller 134 according to the second operating parameter S_size_2 to get a second operating value. The control device 130 determines to assign the reading commands R_a to R_c to the first disk 110 or the second disk 120 via the controller 134 according to the lowest hit of the second operating value.

For example, when the second operating parameter S_size_2 is 0x04, the control device 130 shifts the data starting address LAB_S_a (0x0001) of the reading command R_a to the right by four bits via the controller 134 to get the second operating value 0x0000. The lowest bit of the second operating value is 0, and thus the reading command R_a is assigned to the first disk 110. The control device 130 shifts the data starting, address LAB_S_a (0x0010) of the reading command R_b to the right by four bits via the controller 134 to get the second operating value 0x0001. The lowest bit of the second operating value is 1, and thus the reading command R_b is assigned to the second disk 120.

The control device 130 shifts the data starting address LAB_S_c (0x0100) of the reading command R_c to the right by four bits via the controller 134 to get the second operating value 0x0010. The lowest bit of the second operating value is 0, and thus the reading command R_c is assigned to the first disk 110.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. A disk array system, electrically connected to a host to receive a reading command of the host, wherein the reading command includes a data starting address, the disk array system comprising:
   a first disk;
   a second disk; and
   a control device electrically connected to the first disk and the second disk, wherein the control device receives the reading command, executes an AND logic operation with a lowest byte of the data starting address of the reading command and a first operating parameter, which corresponds to a stripe size of the first disk or the second disk, to acquire a first operating value, assigns the reading command to the first disk when none of the bits of the first operating value is "1", and assigns the reading command to the second disk when at least one of the bits of the first operating value is "1",
   wherein the first disk or the second disk which receives the reading command reads corresponding data according to the reading command.

2. The disk array system according to claim 1, wherein the data stored in the first disk and the second disk are the same.

3. The disk array system according to claim 1, wherein the first disk or the second disk which receives the reading command sends the corresponding data and a corresponding state to the host.

4. The disk array system according to claim 1, wherein the first disk or the second disk which receives the reading command reads the corresponding data by using a native command queuing (NCQ) technology according to the reading command.

5. The disk array system according to claim 1, wherein the disk array system is a redundancy array of independent disk 1 (RAID 1) system.

6. A data processing method applied to a disk array system, wherein the disk array system is electrically connected to a host, and the disk array system includes a first disk and a second disk, the data processing method comprising following steps:
   receiving a reading command, wherein the reading command includes a data starting address;
   executing an AND logic operation with a lowest byte of the data starting address of the reading command and a first operating parameter, which corresponds to a stripe size of the first disk or the second disk, to acquire a first operating value;
   determining to assign the reading command to the first disk or the second disk according to whether any one of bits of the first operating value is "1", wherein the reading command is assigned to the first disk when none of the bits of the first operating value "1", and the reading command is assigned to the second disk when at least one of the bits of the first operating value is "1"; and
   reading corresponding data according to the reading command via the first disk or the second disk which receives the reading command.

7. The data processing method according to claim 6, wherein the data stored in the first disk and the second disk are the same.

8. The data processing method according to claim 6, wherein the data processing method further includes:
   sending the corresponding data and a corresponding state to the host via the first disk or the second disk which receives the reading command.

9. The data processing method according to claim 6, wherein the step of reading the corresponding data according to the reading command includes:
   reading the corresponding data according to the reading command by using an NCQ technology and via the first disk or the second disk which receives the reading command.

10. The data processing method according to claim 6, wherein the disk array system is an RAID 1 system.

* * * * *